Aug. 24, 1954     H. A. NORTON     2,687,160
ANTISKID DEVICE FOR TIRES
Filed May 3, 1951     2 Sheets-Sheet 1
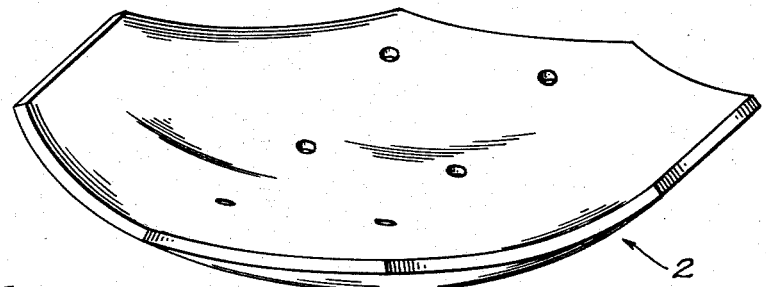
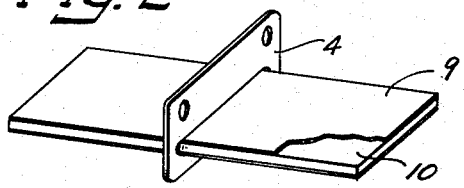
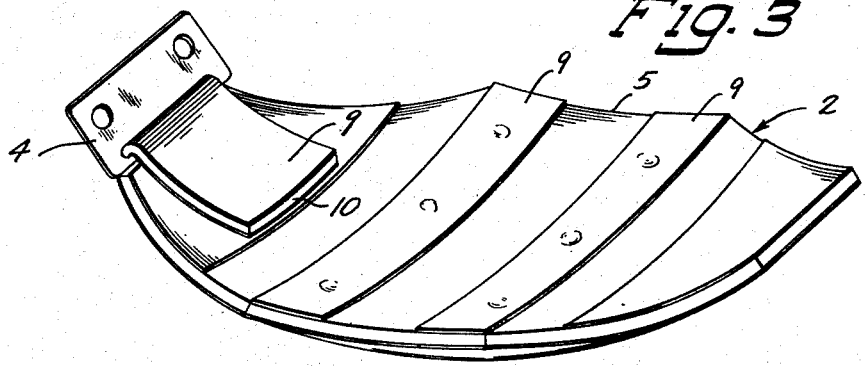
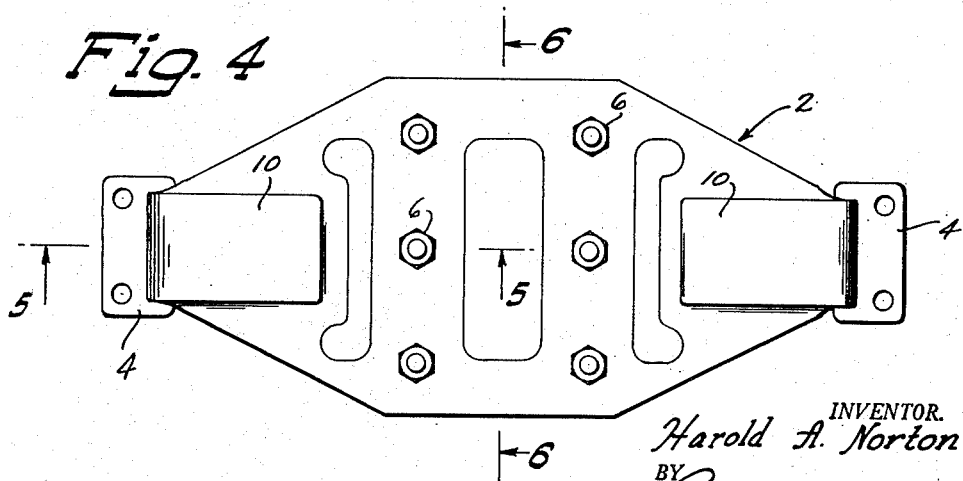
INVENTOR.
Harold A. Norton
BY
Andrus & Sceales
Attorneys Aug. 24, 1954
H. A. NORTON
2,687,160
ANTISKID DEVICE FOR TIRES
Filed May 3, 1951
2 Sheets-Sheet 2
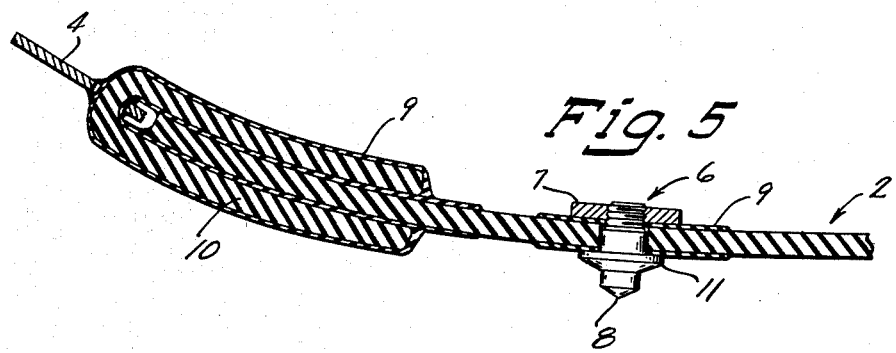
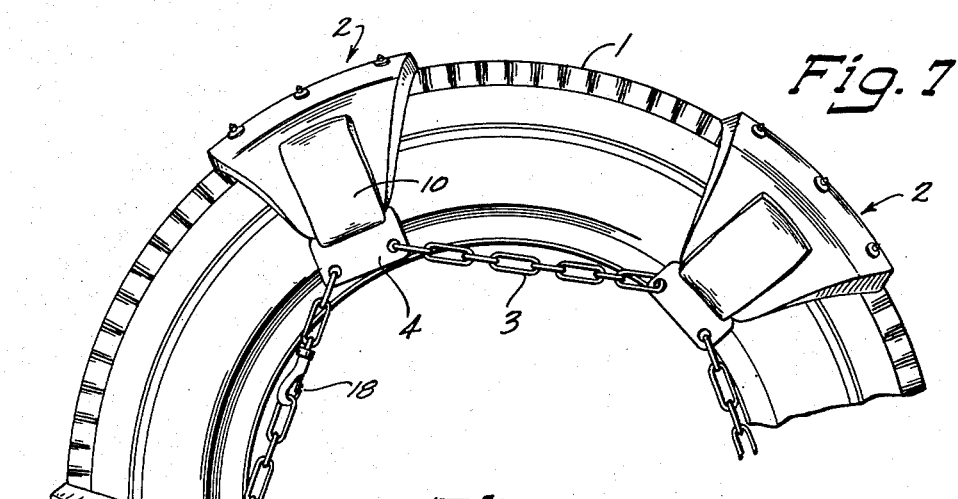
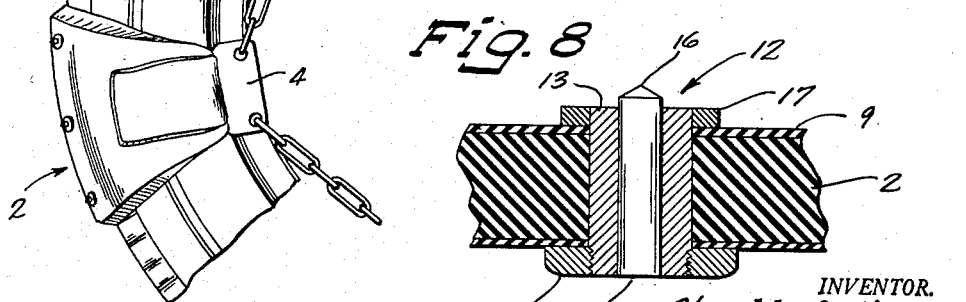
INVENTOR.
Harold A. Norton
BY
Rudram & Sealer
Attorneys Patented Aug. 24, 1954

2,687,160

UNITED STATES PATENT OFFICE 2,687,160

ANTISKID DEVICE FOR TIRES

Harold A. Norton, Chippewa Falls, Wis.

Application May 3, 1951, Serial No. 224,360

4 Claims. (Cl. 152—222)

This invention relates to an antiskid device for tires and particularly to a device having a plurality of shoes which provide vehicles with improved traction on ice and in snow.

One object of the invention is to provide antiskid shoes on tires which minimize slippage of the tires on ice and snow.

Another object is to provide antiskid shoes for tires which are readily assembled thereon.

A further object is to provide antiskid shoes for tires which will stand up a substantial length of time in service, and wherein the calks used are specially prepared for a firm grip of slippery surfaces and long life.

These and other objects of the invention will appear hereinafter in connection with the description of embodiments of the invention as illustrated in the accompanying drawings.

In the drawings:

Figure 1 is a perspective view of an initial rubber blank forming the base of a shoe with calk holes provided therein;

Fig. 2 is a perspective view of a bracket assembled on the shoe;

Fig. 3 is an elevational view with parts in section and exaggerated in thickness showing a shoe and brackets assembled for molding and the piece as reinforced in certain portions;

Fig. 4 is a top plan view of a molded shoe with calks in place;

Fig. 5 is an enlarged section taken on line 5—5 of Fig. 4;

Fig. 6 is an enlarged section taken on line 6—6 of Fig. 4;

Fig. 7 is an elevational view of a portion of a tire with three shoes assembled thereon; and, Fig. 8 is an enlarged detail veiw of a specially constructed calk.

In general the invention is directed to an antiskid device formed of a plurality of flexible shoe members assembled over a tire in circumferentially spaced relation and held thereon by chains extending between brackets molded into each end of the shoes. The shoes are formed of a prestretched rubber reinforced in those areas requiring additional strength and carry a plurality of pointed replaceable calk members of special construction for engagement with icy surfaces to prevent the vehicle from slipping thereon and to give greater traction in snow. The invention also deals with the method of making the shoes and calks.

Referring to the drawings, there is shown in Fig. 7 a tire 1, upon which is assembled a plurality of shoes 2 of the invention, circumferentially spaced from each other around the tire and secured together and held on tire 1 by chains 3. Chains 3 are secured to metal brackets or buckles 4, provided on the opposite ends of each shoe, and extend between the shoes on each side of the tire. The chains are constructed so that some of the chains can be unlatched, as will be described, to permit ready assembly and disassembly of the shoes with respect to the tire with which they are employed.

Each shoe 2 of the invention has in general an octagonal shape and comprises a base 5, to each end of which are secured the brackets 4. A plurality of metal calks 6 extend through base 5, and are secured to the base by nuts 7, which are threaded onto the inner ends of the calks. Each calk 6 is provided with a sharpened point 8 at the outer side to engage the surface over which the shoe rides. By way of example, six calks 6 are shown in rows of three, and the rows are spaced a substantial distance to locate the calks in line near the peripheries of the tire over which the shoe is disposed. The brackets 4 are molded to each end of base 5, as will be described, and have a pair of spaced holes to receive respective ends of chain 3.

Under one method of making a shoe of the invention, base 5 is cut to shape from a pad of four-ply rubber material, and provided with holes to receive calks 6. The rubber material employed is prestretched rubber in order to prevent any stretching of the rubber after it is finally molded. In order to reinforce the ends and edges of base 5, the same are covered with a layer of gum rubber 9. The area of the base around the holes, in which the calks are located, is also reinforced by gum rubber 9, which extends transversely of the base to prevent tearing by the calks. Fig. 3 illustrates the application of the gum rubber, and Fig. 5 shows the additional thickness obtained at the end of base 5 and the calk hole areas by gum rubber 9. In addition, it is desirable that gum rubber 9 be applied to the entire outer side of base 5 to reinforce the same.

Brackets 4 are provided with a rubber strip 10, which passes through a slot in the lower part of each bracket. Strip 10 also is of a reclaimed or prestretched rubber, to which is applied gum rubber 9 for reinforcing the same. The term gum rubber, as used, refers to previously unused rubber and new rubber that has not been prestretched.

After the gum rubber is applied, as described, the brackets 4 are assembled on each end of base 5 of a shoe by folding the strip so that a portion thereof lies on each side of the base, and the brackets extend laterally from the end of the base. When assembled in this manner, the base 5 at the ends corresponds in width to the width of the brackets. The parts are then disposed in a mold, not shown, and subjected to molding temperatures and to pressures approximating one hundred fifty pounds per square inch for about twenty minutes, until the parts are molded integrally together to hold the brackets securely in place and form shoe 2, as illustrated in Fig. 4.

Calks 6 are next assembled in the holes in base 5, initially provided, the gum rubber being pierced in alignment with the holes in base 5. The nuts 7 are threaded home on the inner ends of the calks to secure them in place. The point 8 of each calk projects from the outer or exposed surface of the base a slight distance.

Calks 6, which prevent the vehicle from skidding on ice, may be constructed in several different ways.

Calks 6, for ordinary usage, as shown in Fig. 5, are formed of one piece comprising a central shaft extending through the shoe, the outer side being provided with a collar 11, disposed against the outer side of the shoe, and from which extends the shaft which is tapered to the relatively sharp point 8 for engagement with icy surfaces. The underside of the central shaft is threaded to receive nut 7 for securing the calk to the shoe, and making the calks readily replaceable. The calks 6 are hardened on the outer surface, such as by carburization, to withstand engagement with hard surfaces and objects in service.

In the case of heavy trucks, a calk 12, like that illustrated in Fig. 8, may be employed. This calk comprises a hollow shaft 13, threaded at one end to receive nut 14. A piece 15 of steel of a hardness considerably greater than that of shaft 13 is inserted within hollow shaft 13. Piece 15 tapers to a sharp point 16, for engagement with icy surfaces. A separate collar 17 is press-fitted onto the opposite side of shaft 13 from nut 14 to be against the outer surface of the shoe when nut 14 is threaded home. This construction provides stronger points on the calk better able to withstand wear under heavy loads.

In assembling shoes 2 on tire 1, each shoe is laid across the tire so that the shoe extends across the tire and downwardly on each side to dispose the brackets 4 on opposite sides of the tire near the inner circumference of the tire. As illustrated in Figs. 1 and 3, the base of the shoe is initially provided so that the ends tend to fold toward each other, making the finished shoe readily assembled over a tire. When in place, calks 6 or 12, as the case may be, lie in rows of three adjacent the outer periphery of the tire. Since the area between the calks is not as thick as the area around the calks, except for along the edges, the shoe is substantially flexible and tends to clamp the tire.

After several shoes are assembled on a tire with the chains 3 disposed between each shoe, as shown in Fig. 7, the shoes are secured to the tire by locking the chains 3 by means of locks 18. When the calks wear in service, they are readily removed by unthreading nut 7 or 14, as the case may be, and replaced by new calks.

The calks tend to dig into and grip icy surfaces under the weight of the vehicle to prevent a wheel from skidding on ice, as well as providing better traction in snow. The specially constructed calks insure calks which will stand up in service. The employment of prestretched rubber material gives the flexibility desired, and yet makes certain that the shoes will tightly fit a tire and remain of substantially a predetermined length in service. The reinforced portions of the shoe give it the required strength where needed, while leaving the shoe flexible at areas where the strength requirements are not so great. The rubber material tends to dampen noise from the shoes in service.

Various embodiments of the invention may be employed within the scope of the following claims.

I claim:

1. In an antiskid device for application to a vehicle tire for improved traction of the vehicle on ice and snow, a plurality of circumferentially spaced generally flexible shoes having a body portion of molded rubber material of a size and length to overlie a tire transversely and extend inwardly on both sides of the tire and which has been stretched prior to molding to a limit preventing stretching thereof after molding, said shoe being formed with the ends of each shoe tending to fold toward each other to conform to the shape of the tire, a metal bracket molded to the end of each shoe, means extending from each bracket to the bracket of adjacent shoes to secure the shoes to the tire, a plurality of calks secured to each shoe and projecting from the outer surface of each shoe to engage ice or snow covered surfaces for effective gripping thereof, and gum rubber reinforcement strips secured to each shoe along the ends and edges of the body portion of each shoe and transversely of the body portion of each shoe across the holes in which the calks are disposed to reinforce the shoe.

2. In an antiskid device for application to a vehicle for improved traction of the vehicle on ice and snow, a plurality of circumferentially spaced generally flexible shoes having a body portion of molded rubber material of a size and length to overlie a tire transversely and extend inwardly on both sides of the tire and which has been stretched prior to molding to a limit preventing stretching thereof after molding, a metal bracket having a slot therein to receive a strip of rubber prepared against stretching after molding in the same manner as the body portion of said shoes and overlapping each end of each shoe with the rubber strip being reinforced by a layer of gum rubber and molded to the shoe to secure the bracket to the shoe, means extending from each bracket to the bracket of an adjacent shoe to secure the shoes to a tire, and a plurality of calks secured to each shoe and projecting from the outer surface of each shoe to engage ice or snow covered surfaces for effective gripping thereof.

3. In an antiskid device for application to a vehicle tire for improved traction of the vehicle on ice and snow, a flexible shoe comprising a base of rubber which has been stretched prior to molding to a limit preventing stretching thereof after molding and shaped to fit over a tire with the side edges thereof extending inwardly on both sides of the tire, means to secure the shoe on the tire, gum rubber covering substantially the entire exposed surface of the prestretched rubber base and integrally bonded thereto, and a plurality of calks secured to the shoe and projecting from the exposed surface of the shoe to engage ice or snow covered surfaces for effective gripping thereof.

4. In an antiskid device for application to a vehicle tire for improved traction of the vehicle on ice and snow, a flexible shoe comprising a base of rubber which has been stretched prior to molding to a limit preventing stretching thereof after molding and shaped to fit over a tire with the side edges thereof extending inwardly on both sides of the tire, means to secure the shoe on the tire, gum rubber covering substantially the entire exposed surface of the prestretched rubber base and integrally bonded thereto, a plurality of calks secured to the shoe and projecting from the exposed surface of the shoe to engage ice or snow covered surfaces for effective gripping thereof, and strips of gum rubber covering prestretched rubber on the inside of the shoe over the area in which the calks are secured to said prestretched rubber.

References Cited in the file of this patent

UNITED STATES PATENTS

| Number | Name | Date |
|---|---|---|
| 1,830,556 | Nelson | Nov. 3, 1931 |
| 2,267,242 | Lutey | Dec. 23, 1941 |
| 2,459,757 | Smith | Jan. 18, 1949 |
| 2,469,666 | Raz-Ammann | May 10, 1949 |
| 2,538,134 | Trautwein | Jan. 16, 1951 |
| 2,540,230 | Andrews | Feb. 6, 1951 |